May 11, 1937.　　　E. H. SACHLEBEN　　　2,080,095
TUBE SHAPING TOOL
Filed Sept. 3, 1935　　　3 Sheets-Sheet 1

INVENTOR:
Edward H. Sachleben
by [signature]
HIS ATTORNEYS.

May 11, 1937.　　E. H. SACHLEBEN　　2,080,095
TUBE SHAPING TOOL
Filed Sept. 3, 1935　　3 Sheets-Sheet 2
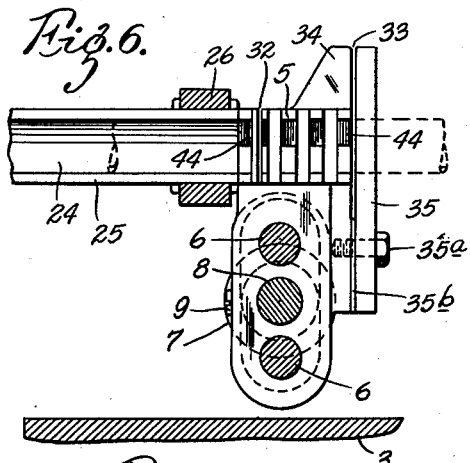
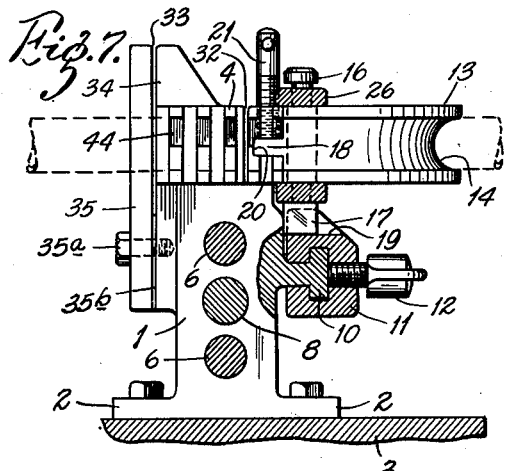
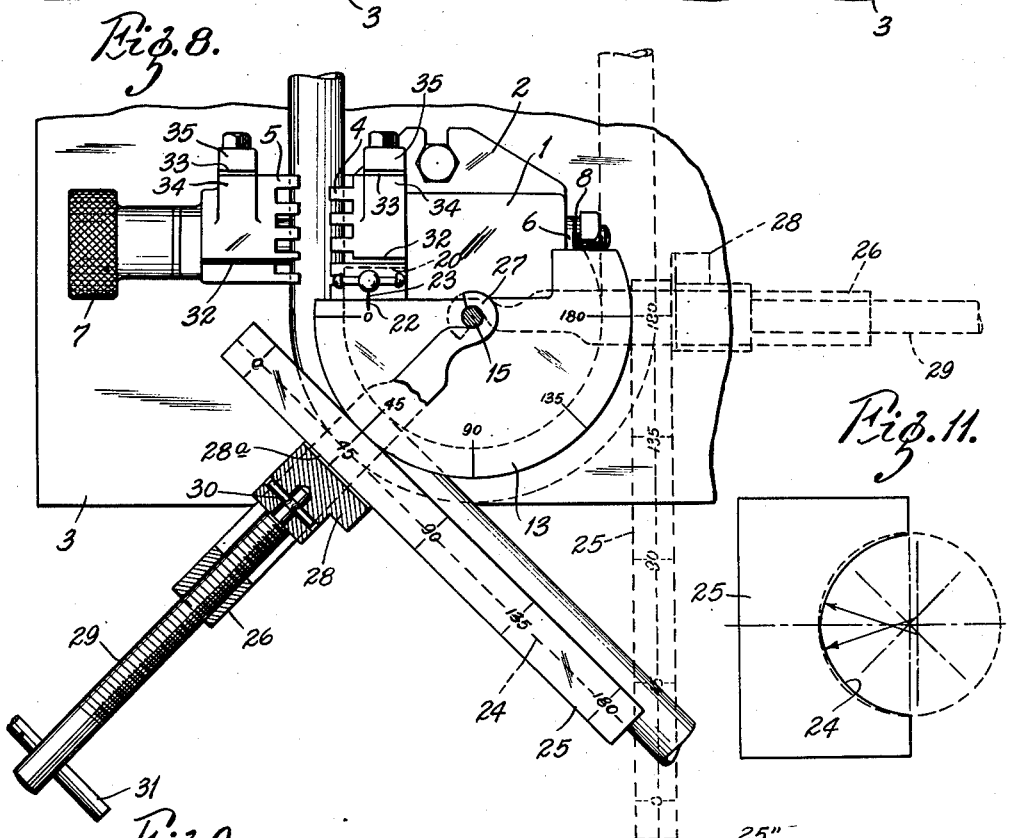
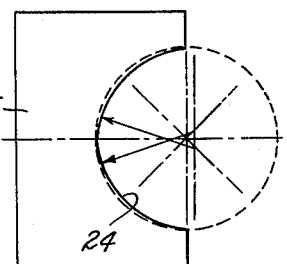
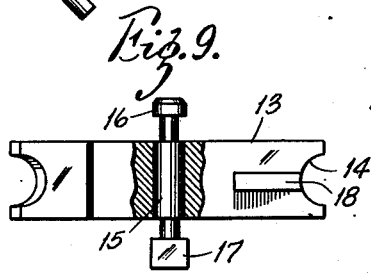
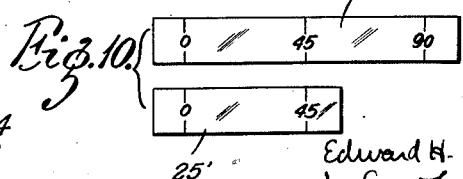
INVENTOR:
Edward H. Sachleben,
by Cantlan & Gravely
HIS ATTORNEYS May 11, 1937. E. H. SACHLEBEN 2,080,095
TUBE SHAPING TOOL
Filed Sept. 3, 1935 3 Sheets-Sheet 3

INVENTOR:
Edward H. Sachleben,
by Cantlan Gravely,
HIS ATTORNEYS.

Patented May 11, 1937

2,080,095

UNITED STATES PATENT OFFICE 2,080,095

TUBE SHAPING TOOL

Edward H. Sachleben, St. Louis, Mo.

Application September 3, 1935, Serial No. 38,942

18 Claims. (Cl. 153—46)

This invention relates to tools for shaping tubes. It has for its principal object to provide a tool that will form bends of different radii and different lengths in tubes of different diameters; that will flare the ends of the tube, that will facilitate the operation of sawing the tube, that will bend the tube without marring the same and without substantial change in the wall thickness thereof, that will indicate to the operator the length of tubing that will be required for a bend of given length and radius in a tube of a given diameter, and that will provide for ease of operation, simplicity and cheapness of construction and compactness of design. The invention consists in the tube shaping tool and in the construction, parts and combinations and arrangements of parts hereinafter described and claimed.

In the accompanying drawings, which form part of this specification and wherein like symbols refer to like parts wherever they occur, Fig. 1 is a plan view of a tube shaping tool embodying my invention, showing a tube in position before being bent;

Fig. 6 is a vertical cross-section on the line 6—6 in Fig. 2;

Fig. 7 is a similar section on the line 7—7 in Fig. 2;

Fig. 8 is a view similar to Fig. 1 showing the tube in position while being bent;

Fig. 9 is a detail view, partly in section, of one of the grooved forming blocks over which the tube is bent;

Fig. 10 is a view illustrating two of the grooved blocks used in bending the tube around the forming block;

Fig. 11 is an end view of one of the bending blocks, showing the shape of the groove therein;

Figure 1:
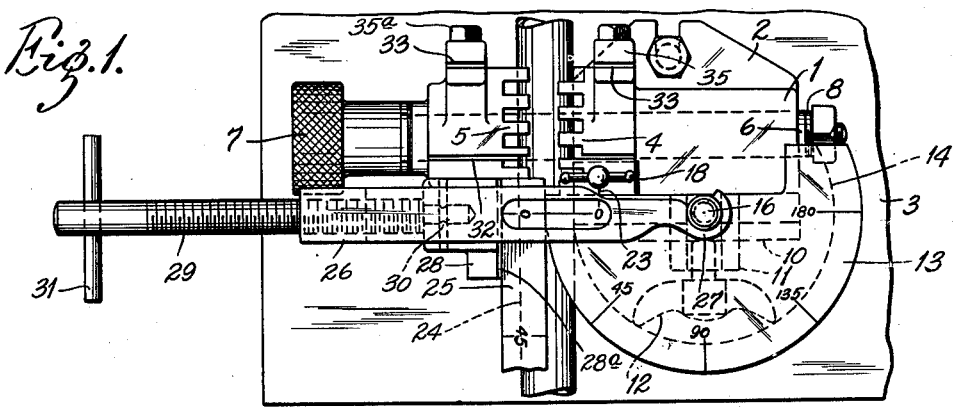

My tube shaping tool comprises an upright main body portion 1 provided with base flanges 2 adapted to be bolted or otherwise secured to a table or bench 3. The tool is provided with a tube grip or vise comprising a stationary jaw 4 and a movable jaw 5 that are each provided with a series of vertically disposed teeth having V-shaped notches in their tube-engaging surfaces. The movable jaw 4 is formed by an upstanding portion at one end of the main body portion of the tool. The stationary jaw 4 is fixed to the corresponding ends of two vertically spaced, horizontally disposed rods 6 that are slidably mounted in bores provided therefor in the upright body portion 1 of the tool. The movable jaw 5 is actuated by means of a knurled knob 7 fixed to one end of a screw rod 8 that extends through said jaw into a threaded bore provided therefor in the tool body 1. The screw rod 8 is secured in the movable jaw 5 by means of a lock screw 9 that engages an annular groove 8a provided therefor in said screw, thereby permitting rotation while preventing endwise movement of said screw rod in said jaw.

Extending from end to end of the upright body portion 1 of the tool along one side thereof is an outstanding rib 10 of substantially T-shaped cross-section on which is slidably supported a slide member 11 that is held in the desired position of its sliding movement by means of a lock screw 12. A die or forming block 13 in the form of a substantially semicircular plate has a groove 14 in its periphery in the form of a circular arc having a length slightly more than one hundred eighty degrees and a radius corresponding to the concave side of the bend that is to be formed in the tube; and the transverse radius of curvature of said groove corresponds substantially to the semi-diameter of said tube. The forming block 13 is provided at the center of the radius of curvature of the arcuate grooves therein with a stud or pin 15 that projects above and below said block and terminates in its upper end in a head 16 and in its lower end in a squared portion 17. The block is also provided on its straight side with an outstanding lug 18. The forming block is attached to the tool by placing the squared lower end portion 17 of its pin 16 in a recess 19 provided therefor in the upper surface of the slide member 11 and by placing the lug 18 of said block in an outwardly opening horizontal groove 20 provided therefor in the adjacent vertical face of the upstanding stationary jaw portion 4 of the main body portion 1 of the tool. The forming block 13 is rigidly held in place by means of a lock screw 21 that extends into the lug receiving groove 20 and bears against the lug 18 of said block. The forming block is positioned to bring the bottom of its arcuate groove 14 tangent to the adjacent side of the tube that is held in the vise by bringing a mark 22 thereon into register with an index mark 23 on the main body portion 1 of the tool. The upper surface of the forming block is also marked to indicate angles of forty-five, ninety, one hundred thirty-five and one hundred eighty degrees extending from a point marked zero that indicates the point of tangency of the groove in the block with the wall of the tube engaged therewith.

The tube is bent around the groove 14 in the forming block 13 by means of straight bending blocks, each having a longitudinal groove 24 therein whose radius of curvature corresponds substantially to that of the tube that is to be bent. As shown in the drawings, these bending blocks are preferably made in three lengths for each diameter of tube, a long block 25 marked to indicate the lengths of arcs of forty-five, ninety, one hundred thirty-five and one hundred eighty degrees, respectively, a short block 25' having a length marked thereon corresponding to the length of an arc of forty-five degrees, and a block 25'' of a length intermediate between said long and short blocks and marked to indicate the lengths of arcs of forty-five and ninety degrees.

The bending blocks are supported in a bending arm in the form of a yoke 26 whose branches terminate at their free ends in hooks 27 adapted to engage the stud 15 of the forming block 13 above and below the latter, whereby said bending arm is adapted to be swung about an axis disposed concentric to the longitudinal radius of curvature of the tube receiving groove 14 in said block. The straight bending block 25 is held in contact with the tube that is to be bent by means of a follower 28 that is forced flatwise against the flat side of said block by means of a screw 29 that is threaded through the closed end of the bending yoke 26 and has a rotatable but non-axial sliding connection 30 at one end with said follower and is provided at its outer end with an operating handle 31.

The jaws 4 and 5 of the vise are provided with two pairs of vertical kerfs 32 and 33 for guiding a hand saw in cutting a tube held in said vise. One pair of kerfs 32 is located close to the end of the vise that faces the bending mechanism of the tool and the other pair of kerfs 33 is located at the opposite end of the vise. As shown in the drawings, the kerfs of each pair are located one in the stationary jaw 4 and one in the movable jaw 5 of the vise and are disposed at right angles to the tube axis. The kerfs 33 are formed between upstanding lugs 34 on the jaws of the vise and plates 35 that are fixed to said jaws are spaced therefrom for a considerable distance above and below the tube receiving portions of said jaws, thereby forming relatively deep grooves adapted for use in sawing tubes of a larger diameter than the depth of the shallower kerfs 32. Said plates 35 are secured by cap screws 35a and spacer plates 35b determine the width of the slots formed by said plates.

When it is desired to bend a tube with the above tool, a forming block 13 having a groove of the desired lengthwise and transverse radius of curvature, is secured to the upright main body portion of the tool, in the manner hereinbefore described, with the index mark 22 on said block in register with the index mark 23 on said bottom member. The tube to be bent is then clamped in the vise, a straight bending block 25 having a groove therein adapted to fit the tube is placed in the bending arm 26 which is then hooked over the pin 15 of the forming block 13 for swinging movement about the axis of said pin 15. The screw 29 is then manipulated by means of the handle 31 to move the follower block 28 against the bending block 25 and thus force the bending block 25 into engagement with the portion of the tube that is to be bent. The tube is then bent by rotating the bending handle 31 around the axis of the forming block stud 15. During this swinging movement of the bending arm 26, the bending block 25 moves around the forming block 13 and operates to lay the portion of the tube engaged therewith in the groove in the forming block. The bending block 25 remains tangent to the forming block during the travel of said bending block around said forming block 13, and said bending block slides lengthwise along the contacting face of the follower block 28 which presses said bending block against the tube; but there is, however, no relative movement between the tube and the bending block.

If a bend of forty-five degrees is to be made in the tube, it is preferable to use the short bending block 25', especially in cases where the tube is to be formed with another reverse bend. For the same reason, it is preferable to use the block 25'' of intermediate length for a ninety degree bend. The long block 25 is used for bends of from ninety to one hundred eighty degrees. As stated above, the blocks are graduated to indicate bends of forty-five, ninety, one hundred thirty and one hundred eighty-five degrees. Thus, when a graduation on a bending block 25 comes into register with a correspondingly numbered graduation on the forming block 23, it indicates to the operator the angle of the bend that has been made.

Figure 2:
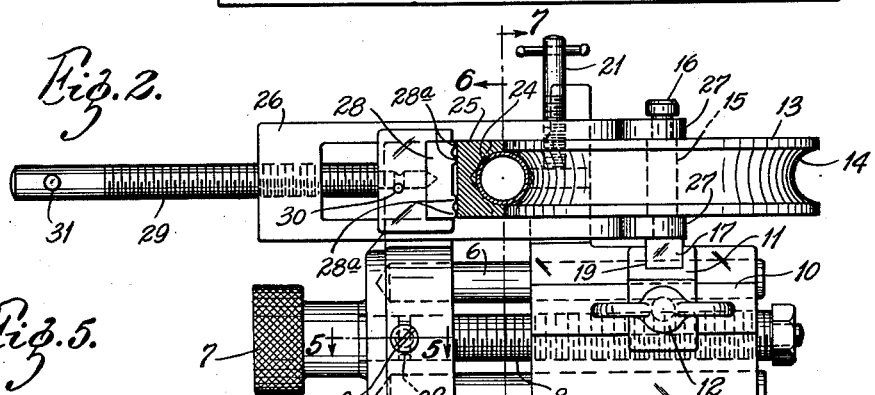
Fig. 2 is a side elevational view of said tool.
Figure 5:
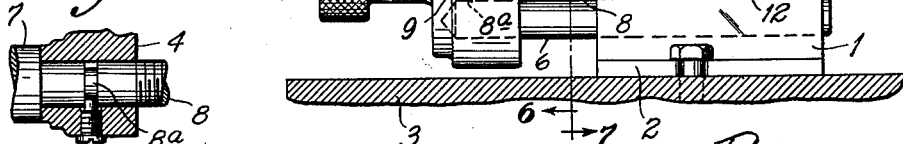
Fig. 5 is a fragmentary horizontal section on the line 5—5 in Fig. 2.
Figure 3:
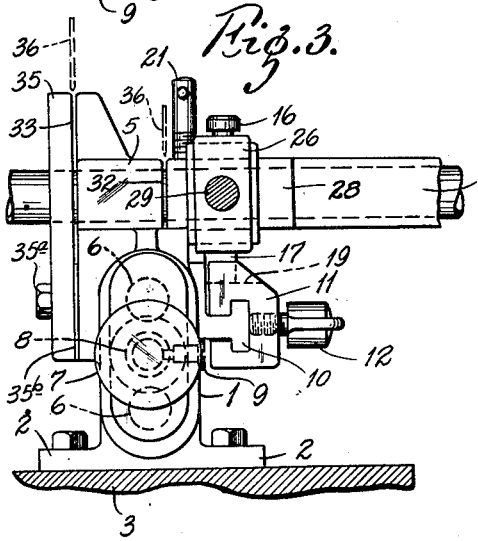
Fig. 3 is a view looking at one end of the tool, the screw of the bending arm being shown in cross-section.
Figure 4:
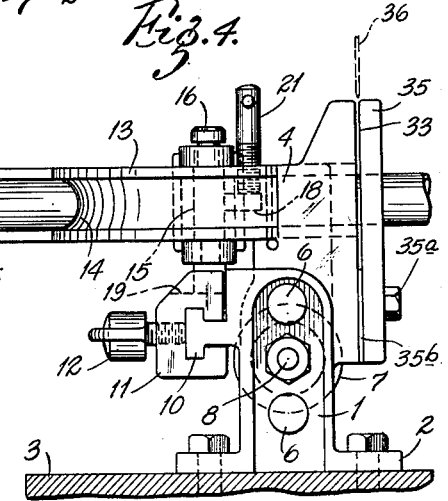
Fig. 4 is a view of the opposite end of said tool.
Figure 12:
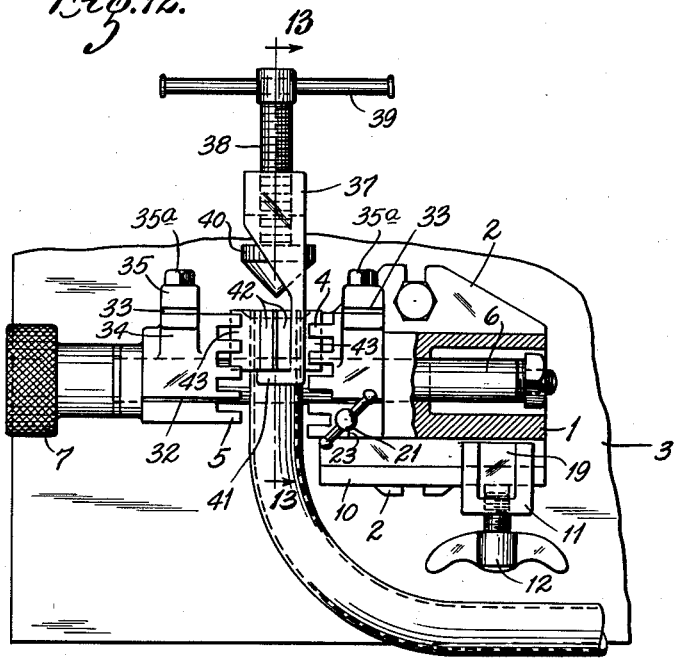
Fig. 12 is a view of the tool with the tube flaring element attached thereto.
Figure 13:
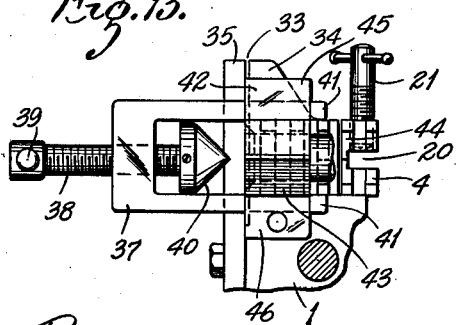
Fig. 13 is a vertical section on the line 13—13 in Fig. 12.
Figure 14:
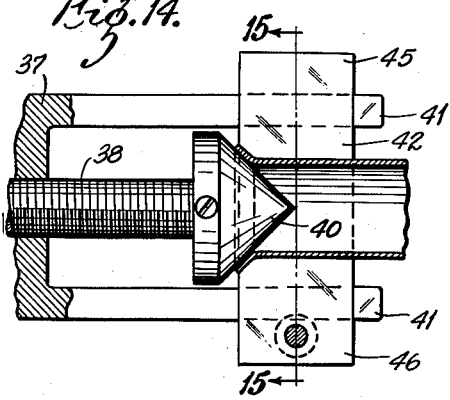
Fig. 14 is an enlarged fragmentary vertical section through the flared end portion of the tube and the flaring parts associated therewith.
Figure 15:
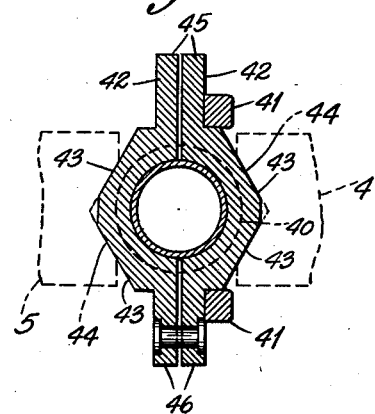
Fig. 15 is a vertical cross-section on the line 15—15 in Fig. 14.

As shown in Fig. 2, the bending block engaging face of the follower block 28 is provided with longitudinal ribs 28a to cut down the area of surface contact between said blocks, and thus reduce the friction therebetween.

As shown in Fig. 11, the groove in the bending block 25 is flattened on each side between its points of minimum and maxium depth, which flattening has the effect of preventing the tube wall on the convex side of the bend from being drawn too thin and on the concave side of the bend from buckling. In other words, the width of said groove corresponds to the diameter of the tube and the depth of said groove corresponds to the semi-diameter of said tube, but the radius of curvature of said groove between each side edge thereof and the middle or bottom thereof is greater than the semi-diameter of said tube. The adjustability of the forming block 13 transversely of the vise permits the groove 14 of the forming block to be brought into contact with a tube having a flare fitting thereon that is held in the jaws of the vise.

The vertical kerfs 32, 33 in the jaws of the vise serve as guides for a hand saw 36 in cutting square ends on a tube held in the vise without crushing or marring the tube and without leaving objectional burrs thereon.

The tube flaring mechanism of the above tool comprises a yoke 37 having a screw 38 threaded through the closed end thereof that is provided at its outer end with an operating handle 39 and at its inner end with a cone shaped flaring member 40. The free ends of the branches of the yoke member 37 terminate in a hook portion 41, the purpose of which will hereinafter appear. The tube whose end is to be flared is held in the vise by means of a clamp comprising duplicate half sections 42 that are grooved to receive the tube and are provided on their outside faces with reversely inclined portions 43 adapted to seat within V-shaped notches 44 formed in the teeth of the jaws 4, 5 of the vise. The two half sections are provided at their tops and bottoms with upstanding and depending lugs or flanges 45 and 46, respectively; and the yoke 37 which carries the flaring member 40 is attached to the clamp 42 by hooking the free ends 41 of the branches of the yoke around the top and bottom flanges of said clamp, thereby preventing relative endwise movement of the clamp and yoke when the screw is operated to force the flaring member into the end of the tube, in said clamp.

Obviously, the hereinbefore described tool admits of considerable modification without departing from the invention. Therefore, I do not wish to be limited to the precise construction shown and described.

What I claim is:

1. A tube bending tool comprising a main body portion, a tube gripping device, a block mounted on said main body portion and having an arcuate forming groove therein, a quick detachable bending arm mounted for swinging movement about the axis of said arcuate groove, a straight bending block having a longitudinal groove therein adapted to fit said tube, said block being supported in said bending arm for movement therewith, said forming block having circumferentially spaced graduations thereon indicating bends of different angles and said bending block having longitudinally spaced graduations thereon indicating the length of straight tubing required for making the different bends and adapted during the bending operation to register with the graduations on said forming block to indicate the angle of the bend made.

2. A tube bending tool comprising a main body portion, a tube gripping device including a pair of relatively movable jaws, a block mounted on said main body portion and having an arcuate forming groove therein, a quick detachable bending arm mounted for swinging movement about the axis of said arcuate groove, a straight bending block having a longitudinal groove therein adapted to fit said tube, said block being supported in said bending arm for movement therewith, said forming block being mounted on said main body member for adjustment thereon to bring the groove of said forming block into line with the tube gripping device.

3. A tube bending tool comprising a main body portion, a tube gripping device, a block mounted on said main body portion and having an arcuate forming groove therein, a quick detachable bending arm mounted for swinging movement about the axis of said arcuate groove, a straight bending block having a longitudinal groove therein adapted to fit said tube, said block being supported in said bending arm for movement therewith, the tube engaging groove in said bending block being of a width and depth corresponding substantially to the diameter and semi-diameter, respectively, of the tube with which it is to be used, but the curvature of said groove between each side thereof and the middle thereof being greater than the semi-diameter of said tube.

4. A tube bending tool comprising a main body portion, a tube gripping device, a block mounted on said main body portion and having an arcuate forming groove therein, a quick detachable bending arm mounted for swinging movement about the axis of said arcuate groove, a straight bending block having a longitudinal groove therein adapted to fit said tube, said block being supported in said bending arm for movement therewith, said forming block having graduations thereon indicating bends of different angles and said bending block having graduations thereon indicating the length of tubing required for making the different bends, the tube engaging groove in said bending block being of a width and depth corresponding substantially to the diameter and semi-diameter, respectively, of the tube with which it is to be used, but the curvature of said groove between each side thereof and the middle thereof being greater than the semi-diameter of said tube.

5. A tube bending tool comprising a main body portion, a tube gripping device, a block mounted on said main body portion and having an arcuate forming groove therein, a quick detachable bending arm mounted for swinging movement about the axis of said arcuate groove, a straight bending block having a longitudinal groove therein adapted to fit said tube, said block being supported in said bending arm for movement therewith, a follower block mounted in said bending arm alongside of the outer face of said bending block, and a screw threaded through said bending arm and operatively connected to said follower block to hold the same in contact with said bending block.

6. A tube bending tool comprising a main body portion, a tube gripping device, a block mounted on said main body portion and having an arcuate forming groove therein, a quick detachable bending arm mounted for swinging movement about the axis of said arcuate groove, a straight bending block having a longitudinal groove therein adapted to fit said tube, said block being supported in said bending arm for movement therewith, said forming block having graduations thereon indicating bends of different angles and said bending block having graduations thereon indicating the length of tubing required for making the different bends, a follower block mounted in said bending arm alongside of the outer face of said bending block, and a screw threaded through said bending arm and operatively connected to said follower block to hold the same in contact with said bending block.

7. A tube bending tool comprising a main body portion, a tube gripping device, a block mounted on said main body portion and having an arcuate forming groove therein, a quick detachable bending arm mounted for swinging movement about the axis of said arcuate groove, a straight bending block having a longitudinal groove therein adapted to fit said tube, said block being supported in said bending arm for movement therewith, said forming block having graduations thereon indicating bends of different angles and said bending block having graduations thereon indicating the length of tubing required for making the different bends, said tube gripping device comprising a jaw rigid with said body portion, a jaw movable towards and away from said first mentioned jaw, and means for actuating said movable jaw.

8. A tube bending tool comprising a main body portion, a tube gripping device, a block mounted on said main body portion and having an arcuate forming groove therein, a quick detachable bending arm mounted for swinging movement about the axis of said arcuate groove, a bending block having a longitudinal groove therein adapted to fit said tube, said block being supported in said bending arm for movement therewith, said tube gripping device comprising relatively movable jaws having vertical saw grinding grooves therein.

9. A tube bending tool comprising a main body portion, a tube gripping device, a block mounted on said main body portion and having an arcuate forming groove therein, a quick detachable bending arm mounted for swinging movement about the axis of said arcuate groove, a straight bending block having a longitudinal groove therein adapted to fit said tube, said block being supported in said bending arm for movement therewith, said forming block having graduations thereon indicating bends of different angles and said bending block having graduations thereon indicating the length of tubing required for making the different bends, said tube gripping device comprising relatively movable jaws having vertical saw guiding grooves therein.

10. A tube bending tool comprising a main body portion, a tube gripping device, a block mounted on said main body portion and having an arcuate forming groove therein, a bending arm mounted for swinging movement about the axis of said arcuate groove, a straight bending block having a longitudinal groove therein adapted to fit said tube, said block being supported in said bending arm for movement therewith, said tube gripping device comprising relatively movable jaws having pairs of saw guiding grooves formed therein of different depths and spaced apart lengthwise of said jaws.

11. A tube bending tool comprising a main body portion, a tube gripping device, a block mounted on said main body portion and having an arcuate forming groove therein, a quick detachable bending arm mounted for swinging movement about the axis of said arcuate groove, a straight bending block having a longitudinal groove therein adapted to fit said tube, said block being supported in said bending arm for movement therewith, said forming block having graduations thereon indicating bends of different angles and said bending block having graduations thereon indicating the length of tubing required for making the different bends, said tube gripping device comprising relatively movable jaws having pairs of saw guiding grooves formed therein of different depths and spaced apart lengthwise of said jaws.

12. A tube bending tool comprising an upright support, a tube gripping means, a member mounted on said support for movement thereon transversely of the tube gripping means, said member having a recess in the upper face thereof and said body portion having a recess in a vertical face thereof, and a grooved forming block supported on said upright support and having a pin depending from said block and engaging the recess in the top of said slidably supported member and a lug seated in the recess in said upright support.

13. A tube bending tool comprising an upright support, a tube gripping means, a member mounted on said support for movement thereon transversely of the tube gripping means, said member having a recess in the upper face thereof and said body portion having a recess in a vertical face thereof, and a grooved forming block supported on said upright support and having a pin depending from said block and engaging the recess in the top of said slidably supported member and a lug seated in the recess in said upright support, said pin also extending above said block and constituting a pivot for a bending arm.

14. A tube shaping tool comprising a vise including relatively movable jaws, a clamp for said tube adapted to be held between said jaws, and a flaring device comprising a yoke adapted to hook around said clamp, a screw threaded through said yoke member, and a flaring member fixed to the inner end of said screw.

15. A tube bending tool comprising a main body portion, a tube gripping device, a block mounted on said main body portion and having an arcuate forming groove therein, a quick detachable bending arm mounted for swinging movement about the axis of said arcuate groove, a straight bending block having a longitudinal groove therein adapted to fit said tube, said block being supported in said bending arm for movement therewith, said forming block being mounted on said main body member for adjustment thereon to bring the groove of said forming block into line with the tube gripping device and means for locking said forming block against movement in any direction.

16. A tube bending tool comprising an upright support, a tube gripping means, a member mounted on said support for movement thereon transversely of the tube gripping means, means for locking said movable member on said support, said member having a recess in the upper face thereof and said body portion having a recess in a vertical face thereof, and a grooved forming block supported on said upright support and having a pin depending from said block and engaging the recess in the top of said slidably supported member and a lug seated in the recess in said upright support.

17. A tube bending tool comprising an upright support, a tube gripping means, a member mounted on said support for movement thereon transversely of the tube gripping means, said member having a recess in the upper face thereof and said body portion having a recess in a vertical face thereof, a grooved forming block supported on said upright support and having a pin depending from said block and engaging the recess in the top of said slidably supported member, a lug seated in the recess in said upright support and a lock screw engaging said lug.

18. A tube bending tool comprising an upright support, a tube gripping means, a member mounted on said support for movement thereon transversely of the tube gripping means, said member having a recess in the upper face thereof and said body portion having a recess in a vertical face thereof, and a grooved forming block supported on said upright support and having a pin depending from said block and provided with a squared lower end engaging the recess in the top of said slidably supported member and a lug seated in the recess in said upright support.

EDWARD H. SACHLEBEN.